United States Patent
Asmussen et al.

(10) Patent No.: US 8,382,004 B2
(45) Date of Patent: Feb. 26, 2013

(54) FLEXIBLE GRAPHITE FLOORING HEAT SPREADER

(75) Inventors: Erick Rollo Asmussen, Brentwood, TN (US); Robert A. Mercuri, Seven Hills, OH (US); Julian Norley, Chagrin Falls, OH (US); Martin David Smalc, Parma, OH (US); Matthew G. Getz, Medina, OH (US)

(73) Assignee: GrafTech International Holdings Inc., Parma, OH (US)

(*) Notice: Subject to any disclaimer, the term of this patent is extended or adjusted under 35 U.S.C. 154(b) by 1412 days.

(21) Appl. No.: 11/220,349

(22) Filed: Sep. 6, 2005

(65) Prior Publication Data

US 2006/0272796 A1 Dec. 7, 2006

Related U.S. Application Data

(63) Continuation-in-part of application No. 09/826,229, filed on Apr. 4, 2001, now abandoned, and a continuation-in-part of application No. 09/826,225, filed on Apr. 4, 2001, now abandoned.

(51) Int. Cl.
- *F24D 3/16* (2006.01)
- *B32B 9/00* (2006.01)
- *F24D 3/14* (2006.01)
- *F24D 5/10* (2006.01)
- *F16L 59/02* (2006.01)

(52) U.S. Cl. .............. 237/69; 237/70; 237/76; 432/1; 432/6; 432/7; 432/59

(58) Field of Classification Search .............. 237/69, 237/70, 76; 432/1, 6, 7, 59; *B32B 9/00; F24D 3/16, F24D 3/14, 5/10; F16L 59/02*
See application file for complete search history.

(56) References Cited

U.S. PATENT DOCUMENTS

| | | | | |
|---|---|---|---|---|
| 181,859 | A * | 9/1876 | Linsley | 237/69 |
| 1,534,221 | A * | 4/1925 | Kercher et al. | 392/351 |
| 1,742,159 | A * | 12/1929 | Hynes | 219/213 |
| 2,422,685 | A * | 6/1947 | Keck | 237/69 |
| 2,503,601 | A * | 4/1950 | Tice | 219/213 |
| 2,544,547 | A * | 3/1951 | Vogel | 219/522 |
| 2,619,580 | A * | 11/1952 | Pontiere | 219/528 |
| 2,783,639 | A * | 3/1957 | Werner | 52/220.4 |
| 3,037,746 | A * | 6/1962 | Williams | 165/56 |
| 3,177,564 | A * | 4/1965 | Reynolds et al. | 428/553 |
| 3,223,825 | A * | 12/1965 | Williams | 219/213 |
| 3,255,337 | A * | 6/1966 | Willat | 219/528 |

(Continued)

FOREIGN PATENT DOCUMENTS

| DE | 3722017 | 8/1988 |
|---|---|---|
| DE | 3706759 | 9/1988 |

(Continued)

OTHER PUBLICATIONS

Exhibit 1—"ThermoTile Radiant Floor Heating" (undated but admitted to be prior art).

(Continued)

*Primary Examiner* — Steven B McAllister
*Assistant Examiner* — Daniel E Namay

(57) ABSTRACT

A floor heating system includes a flooring substrate having a heating or cooling element in heat transfer relationship therewith. A heat spreader is in heat transfer relationship with the flooring substrate. The heat spreader includes a layer of flexible graphite material. A floor covering overlies the layer of flexible graphite material. Temperature variations across an exposed surface of the floor covering are reduced by the presence of the flexible graphite heat spreader, thus providing an improved and more uniform heating to the floor and to the room with which the floor is associated.

9 Claims, 10 Drawing Sheets

U.S. PATENT DOCUMENTS

| | | | |
|---|---|---|---|
| 3,404,061 A * | 10/1968 | Bochman et al. | 428/143 |
| 3,573,122 A * | 3/1971 | Lawrence et al. | 264/29.1 |
| 3,584,198 A * | 6/1971 | Doi et al. | 219/541 |
| 3,627,988 A * | 12/1971 | Romaniec | 219/529 |
| 3,697,728 A * | 10/1972 | Stirzenbecher | 219/548 |
| 3,780,250 A * | 12/1973 | Ando | 219/618 |
| 4,011,989 A * | 3/1977 | Diggs | 237/59 |
| 4,109,859 A * | 8/1978 | Durst | 237/69 |
| 4,212,348 A * | 7/1980 | Kobayashi | 165/49 |
| 4,508,162 A * | 4/1985 | Radtke | 165/56 |
| 4,779,673 A * | 10/1988 | Chiles et al. | 165/45 |
| 4,817,707 A * | 4/1989 | Aoyama et al. | 165/46 |
| 4,852,645 A * | 8/1989 | Coulon et al. | 165/180 |
| 4,867,377 A * | 9/1989 | Ingestrom | 237/69 |
| 4,895,713 A | 1/1990 | Greinke et al. | 423/448 |
| 5,022,459 A * | 6/1991 | Chiles et al. | 165/11.1 |
| 5,115,969 A * | 5/1992 | Tanaka et al. | 237/69 |
| 5,131,458 A * | 7/1992 | Bourne et al. | 165/56 |
| 5,194,198 A | 3/1993 | von Bonin et al. | 264/42 |
| 5,247,005 A | 9/1993 | von Bonin et al. | 524/496 |
| 5,288,429 A | 2/1994 | von Bonin et al. | 252/378 |
| 5,454,428 A * | 10/1995 | Pickard et al. | 165/49 |
| 5,461,213 A * | 10/1995 | Rodin | 219/213 |
| 5,579,996 A * | 12/1996 | Fiedrich | 237/69 |
| 5,788,152 A * | 8/1998 | Alsberg | 237/69 |
| 5,871,151 A * | 2/1999 | Fiedrich | 237/69 |
| 5,879,491 A * | 3/1999 | Kobayashi | 156/71 |
| 5,902,762 A * | 5/1999 | Mercuri et al. | 501/99 |
| 5,908,573 A * | 6/1999 | Chiles et al. | 219/545 |
| 5,931,381 A * | 8/1999 | Fiedrich | 237/69 |
| 5,957,378 A * | 9/1999 | Fiedrich | 237/69 |
| 6,152,377 A * | 11/2000 | Fiedrich | 237/69 |
| 6,188,839 B1 * | 2/2001 | Pennella | 392/435 |
| 6,220,523 B1 * | 4/2001 | Fiedrich | 237/69 |
| 6,347,748 B1 * | 2/2002 | Lyons | 237/69 |
| 6,482,520 B1 | 11/2002 | Tzeng | 428/408 |
| 6,726,115 B1 * | 4/2004 | Chiles et al. | 237/69 |
| 6,737,611 B2 * | 5/2004 | Ek et al. | 219/213 |
| 6,746,768 B2 | 6/2004 | Greinke et al. | 428/408 |
| 6,776,222 B2 * | 8/2004 | Seki et al. | 165/56 |
| 6,805,298 B1 * | 10/2004 | Corbett | 237/69 |
| 6,841,250 B2 | 1/2005 | Tzeng | 428/408 |
| 6,910,526 B1 * | 6/2005 | Sokolean | 165/56 |
| 6,922,963 B2 * | 8/2005 | Simonelli et al. | 52/480 |
| 7,140,426 B2 | 11/2006 | Huebner et al. | |
| 7,222,801 B2 * | 5/2007 | Meirana et al. | 237/69 |
| 7,799,428 B2 * | 9/2010 | Fujiwara et al. | 428/408 |
| 2002/0157818 A1 * | 10/2002 | Norley et al. | 165/185 |
| 2002/0164483 A1 * | 11/2002 | Mercuri et al. | 428/408 |
| 2002/0166658 A1 * | 11/2002 | Norley et al. | 165/185 |
| 2002/0168526 A1 * | 11/2002 | Mercuri et al. | 428/408 |
| 2003/0044614 A1 * | 3/2003 | Norley et al. | 428/408 |
| 2003/0099836 A1 * | 5/2003 | Gandi et al. | 428/408 |
| 2003/0211314 A1 * | 11/2003 | Rutherford et al. | 428/332 |
| 2004/0026525 A1 * | 2/2004 | Fiedrich | 237/69 |
| 2004/0050945 A1 * | 3/2004 | Bernhardt | 237/69 |
| 2005/0051538 A1 | 3/2005 | Guckert et al. | |
| 2005/0064145 A1 * | 3/2005 | Hoie et al. | 428/167 |
| 2005/0202245 A1 * | 9/2005 | Mercuri et al. | 428/408 |
| 2005/0238835 A1 * | 10/2005 | Sung | 428/40.1 |
| 2006/0035085 A1 * | 2/2006 | Ozaki et al. | 428/408 |
| 2006/0068205 A1 * | 3/2006 | Potier | 428/408 |
| 2006/0188723 A1 * | 8/2006 | Rowley et al. | 428/408 |
| 2007/0134535 A1 * | 6/2007 | Song et al. | 429/34 |
| 2008/0193767 A1 * | 8/2008 | Lee et al. | 428/408 |
| 2008/0248309 A1 * | 10/2008 | Ono et al. | 428/408 |

FOREIGN PATENT DOCUMENTS

| | | |
|---|---|---|
| JP | 2001012067 | 1/2001 |
| JP | 2004125341 | 4/2004 |

OTHER PUBLICATIONS

Exhibit 2—"Heated Flooring System Insulations" (undated but admitted to be prior art).

Exhibit 3—"Radiant Floors Comfort Heating" (undated but admitted to be prior art).

Exhibit 4—"Have the Comfortable Home You Want" (undated but admitted to be prior art).

Exhibit 5—"Installing Hardwood Floors Over Radiant Heating" (undated but admitted to be prior art).

Exhibit 6—HomeExpo.com (undated but admitted to be prior art).

Exhibit 7—Warmboard.com "Warmboard Radiant Subfloor" (undated but admitted to be prior art).

* cited by examiner

FLEXIBLE GRAPHITE FLOORING HEAT SPREADER

The present application is a Continuation-in-Part of U.S. patent application Ser. No. 09/826,229, filed Apr. 4, 2001, now abandoned of Mercuri, et al. and entitled "Graphite Article Having Predetermined Anisotropic Characteristics and Process Therefor," the details of which are incorporated herein by reference. This application is also a Continuation-in-Part of U.S. patent application Ser. No. 09/826,225, of Norley, et al., filed Apr. 4, 2001, now abandoned and entitled "Anisotropic Thermal Solution."

TECHNICAL FIELD

The present invention relates to a graphite article having predetermined anisotropic characteristics, such as anisotropic ratio. More particularly, the invention relates to an article formed from flakes of graphite which have been intercalated and exfoliated and formed into an article having a ratio of in-plane conductivity to through-plane conductivity that has been predetermined and controllably effected. The article may be a heat spreader for use as part of a radiant flooring heating system or the like. A process for preparing the inventive article is also presented.

BACKGROUND OF THE INVENTION

With the development of more and more sophisticated technological components, such as electronic components capable of increasing processing speeds and higher frequencies and fuel cell components requiring specific thermal and electrical conductivity, natural graphite has become a material a choice for certain components. Natural graphite is considered a uniquely advantageous material, since it combines desirable properties such as electrical and thermal conductivity and formability with relatively low weight, especially compared to metals like copper or stainless steel. As such, graphite articles have been proposed for various applications, including thermal management in electronics (specifically, thermal interface materials, heat spreaders and heat sinks), PEM fuel cell components like flow field plates and gas diffusion layers, and as a component of floor heating systems.

With the increased need for heat dissipation from microelectronic devices, thermal management becomes an increasingly important element of the design of electronic products. As noted, both performance reliability and life expectancy of electronic equipment are inversely related to the component temperature of the equipment. For instance, a reduction in the operating temperature of a device such as a typical silicon semiconductor can correspond to an exponential increase in the reliability and life expectancy of the device. Therefore, to maximize the life-span and reliability of a component, maintaining the device operating temperature within the control limits set by the designers is of paramount importance.

Heat sinks are components that facilitate heat dissipation from the surface of a heat source, such as a heat-generating electronic component, to a cooler environment, usually air. In many typical situations, heat transfer between the solid surface of the component and the air is the least efficient within the system, and the solid-air interface thus represents the greatest barrier for heat dissipation. A heat sink seeks to increase the heat transfer efficiency between the components and the ambient air primarily by increasing the surface area that is in direct contact with the air. This allows more heat to be dissipated and thus lowers the device operating temperature. The primary purpose of a heat sink is to help maintain the device temperature below the maximum allowable temperature specified by its designer/manufacturer.

Typically, heat sinks are formed of a metal, especially copper or aluminum, due to the ability of copper to readily absorb and transfer heat about its entire structure. In many applications, copper heat sinks are formed with fins or other structures to increase the surface area of the heat sink, with air being forced across or through the copper fins (such as by a fan) to effect heat dissipation from the electronic component, through the copper heat sink and then to the air.

Limitations exist, however, with the use of copper heat sinks. One limitation relates to copper's relative isotropy—that is, the tendency of a copper structure to distribute heat relatively evenly about the structure. The isotropy of copper means that heat transmitted to a copper heat sink become distributed about the structure rather than being directed to the fins where most efficient transfer to the air occurs. This can reduce the efficiency of heat dissipation using a copper heat sink. In addition, the use of copper or aluminum heat sinks can present a problem because of the weight of the metal, particularly when the heating area is significantly smaller than that of the heat sink. For instance, pure copper weighs 8.96 grams per cubic centimeter (g/cc) and pure aluminum weighs 2.70 g/cc (compare with graphite in the form disclosed herein, which typically weighs between about 0.4 and 1.8 g/cc). In many applications, several heat sinks need to be arrayed on, e.g., a circuit board to dissipate heat from a variety of components on the board. If copper heat sinks are employed, the sheer weight of copper on the board can increase the chances of the board cracking or of other equally undesirable effects, and increases the weight of the component itself. In addition, since copper is a metal and thus has surface irregularities and deformations common to metals, and it is likely that the surface of the electronic component to which a copper heat sink is being joined is also metal or another relatively rigid material such as aluminum oxide or a ceramic material, making a complete connection between a copper heat sink and the component, so as to maximize heat transfer from the component to the copper heat sink, can be difficult without a relatively high pressure mount, which is undesirable since damage to the electronic component could result. Moreover, oxide layers, which are unavoidable in metals, can add a significant barrier to heat transfer, yet are not formed with graphite.

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte and form what is conventionally referred to as a membrane electrode assembly, or MEA. Oftentimes, the electrodes serve the dual function of gas diffusion layer, or GDL, within the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen can be removed. Combinations of such fuel cells are used in a fuel cell stack to provide the desired voltage.

Recently, the use of natural graphite materials have been suggested for use as certain components of a PEM fuel cell. For example, gas diffusion layers and flow field plates made from flexible graphite sheets, such as Grafcell™ advanced flexible graphite materials, available from Graftech Inc. of Lakewood, Ohio, have been employed or disclosed for use in fuel cells.

Prior heating systems utilizing expanded graphite materials have been proposed in U.S. Pat. Nos. 5,288,429; 5,247,005; and 5,194,198; the details of which are incorporated herein by reference. The graphite materials used in those systems have been constructed so that they have generally isotropic thermal conductivities.

The different applications for graphite articles discussed above, as well as others not specifically addressed herein, require differing characteristics for optimization. For instance, a heat spreader may comprise a sheet which requires a maximum of thermal conductivity in the in-plane direction of the sheet (i.e., along the major surfaces of the sheet) in order to effectively spread heat as rapidly as possible. As a comparison, a gas diffusion layer (which can also function as an electrode, as noted above) for an electrochemical fuel cell, also generally in the form of a sheet, may require a certain degree of through-plane (i.e., between its major surfaces) electrical conductivity to assist in directing current flow, while still desiring as much in-plane thermal and electrical conductivity as possible.

Graphite is made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically or electrochemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been expanded, and more particularly expanded so as to have a final thickness or "c" direction dimension which is as much as about 80 or more times the original "c" direction dimension, can be formed without the use of a binder into cohesive or integrated sheets of expanded graphite, e.g. mat, webs, papers, strips, tapes, or the like (typically referred to as "flexible graphite"). The formation of graphite particles which have been expanded to have a final thickness or "c" dimension which is as much as about 80 or more times the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from compression. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.08 g/cc to about 2.0 g/cc. The flexible graphite sheet material exhibits an appreciable degree of anisotropy due to the alignment of graphite particles parallel to the major opposed, parallel surfaces of the sheet. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprise the "a" directions and the thermal, electrical and fluid diffusion properties of the sheet are very different, by orders of magnitude typically, for the "c" and "a" directions.

With respect to electrical properties, the conductivity of anisotropic flexible graphite sheet is high in the direction parallel to the major faces of the flexible graphite sheet ("a" direction), and substantially less in the direction transverse to the major surfaces ("c" direction) of the flexible graphite sheet. With respect to thermal properties, the thermal conductivity of a flexible graphite sheet in a direction parallel to the major surfaces of the flexible graphite sheet is relatively high, while it is relatively low in the "c" direction transverse to the major surfaces.

Given the different uses to which graphite articles produced from flexible graphite sheet are applied, it would be highly advantageous to predetermine or control the anisotropic ratio of the article, in order to optimize certain functional characteristics of the graphite articles for the particular end use. By anisotropic ratio is meant, with respect to either thermal or electrical conductivity, the ratio of in-plane conductivity to through-plane conductivity.

SUMMARY OF THE INVENTION

The invention presented is a graphite article comprising flakes of natural graphite which have been exfoliated and compressed into a graphite article having predetermined anisotropic characteristics, such as anisotropic ratio, more preferably an anisotropic ratio between about 2 and about 250 (with respect to thermal anisotropy) or between about 200 and about 5000 (with respect to electrical anisotropy). The anisotropic ratio of the inventive article (with respect to thermal conductivity, electrical conductivity or a balance of thermal and electrical conductivity in a controlled manner) can be produced by controlled directional alignment of the graphene layers. This can be accomplished, for instance, by control of the flake size of the flakes of graphite prior to intercalation and exfoliation; molding of the exfoliated graphite particles to form the finished graphite article; mechanically altering the orientation of the particles of the graphite article (effected, for instance, by impaction of the graphite article, the application of shear force to the flexible graphite article, embossing of the flexible graphite article, localized impaction of the graphite article, or the combination thereof); or combinations of any of the foregoing.

In another aspect of the invention, a process for producing a finished graphite article having predetermined anisotropic characteristics is presented. The process involves determining the desired anisotropic characteristics for a finished flexible graphite article; intercalating and then exfoliating flakes of graphite to form exfoliated graphite particles; forming a substrate graphite article by compressing the exfoliated graphite particles into a coherent article formed of graphene layers; directionally aligning the graphene layers in the substrate graphite article to provide a finished graphite article having the desired anisotropic characteristics.

In another aspect of the invention, a flooring system is provided comprising a flooring substrate, a heating or cooling element in heat transfer relationship with the flooring substrate, and a heat spreader in heat transfer relationship with the flooring substrate. The heat spreader includes a layer of flexible graphite material overlying the flooring substrate. A floor covering overlies the layer of flexible graphite material. Temperature variations across an exposed surface of the floor covering are reduced by the presence of the layer of flexible graphite material which functions as a heat spreader.

BRIEF DESCRIPTION OF THE DRAWINGS

The present invention will be better understood and its advantages more apparent in view of the following detailed description, especially when read with reference to the appended drawings, wherein.

DETAILED DESCRIPTION OF THE INVENTION

Figure 1:
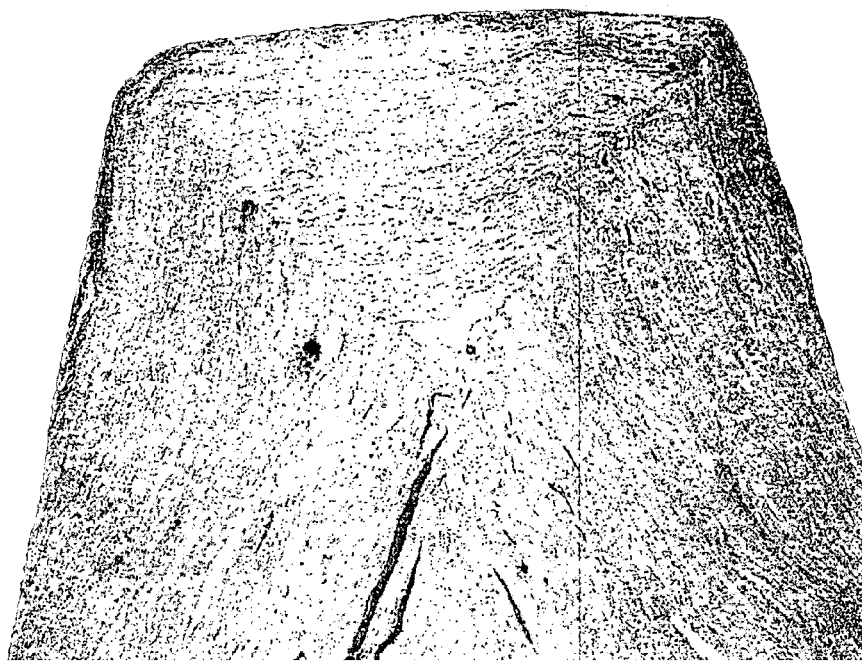
FIGS. 1, 1(A) are photomicrographs, at a magnification of 50× of a cross-section of one of the walls of an embossed flexible graphite sheet prepared in accordance with the present inventions, showing morphologies achievable using void-free (FIG. 1) and non-void-free (FIG. 1(A)) flexible graphite sheet.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and can also be provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be intercalated and exfoliated, is suitable for use with the present invention. Such graphite preferably has an ash content of less than about twenty-five, more preferably less than about ten, weight percent. Most preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. The intercalation solution can also possibly contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 250 to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and/or provided with small transverse openings by deforming mechanical impact.

Flexible graphite sheet and foil are coherent, with good handling strength, and are suitably compressed, e.g. by roll-pressing, to a thickness of about 0.075 mm to 3.75 mm and a typical density of about 0.1 to 2.0 grams per cubic centimeter (g/cc). From about 1.5-30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet, as well as "fixing" the graphite structure as formed (especially the "aligned" graphene layers). Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolak phenolics. Typically, but not necessarily, the resin system is solvated to facilitate application into the flexible graphite sheet. In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin.

It is generally accepted that flexible graphite sheet has an anisotropic ratio, with respect to thermal conductivity, of between about 20-30 (i.e., about 150-200 watts per meter-° C. (W/m° C.) for the in-plane direction vs. about 7 W/m° C. for the through-plane direction); typical anisotropic ratios with respect to electrical conductivity are in the range of about 1600 to 2000 (i.e., about 125,000 siemens/meter (S/m) for in-plane electrical conductivity vs. about 70 S/m for through-plane electrical conductivity). As noted above, however, the ability to "engineer" or predetermine the anisotropic ratio for specific end uses would be highly advantageous. For instance, a thermal anisotropic ratio of at least about 40, and more preferably at least about 70, would be highly desirable for heat spreader applications. In fact, for most heat management applications, including heat sinks and thermal interfaces, a thermal anisotropic ratio of at least about 160 is most preferred.

Likewise, an electrical anisotropic ratio of at least about 2200 is desirable for many applications, in order to maximize directional current flow while still maintaining the weight advantages of the use of graphite. In addition, for electrochemical fuel cell components, it is desirable to achieve a balance between electrical and thermal anisotropic ratios, to optimize current flow while efficiently ridding the fuel cell of heat. Most desirably, a fuel cell component will have an electrical anisotropic ratio of less than about 1500, combined with a thermal anisotropic ratio of greater than about 70.

To that end, a graphite article, specifically an article formed of compressed particles of exfoliated graphite, can be produced so as to have predetermined anisotropic characteristics, more particularly, a predetermined anisotropic ratio. To do so, the article is produced so as to have controlled directional alignment of the graphene layers. More specifically, the greater the directional alignment of graphene layers, the higher the anisotropic ratio. Directional alignment of the graphene layers can be accomplished by, inter alia, control of the flake size of the flakes of graphite prior to intercalation and exfoliation; molding of the exfoliated graphite particles to form the finished graphite article; mechanically altering the orientation of the particles of the graphite article (effected, for instance, by compaction of the substrate graphite article, the application of shear force to the substrate flexible graphite article, embossing of the graphite article, localized impaction of the graphite article, or the combination thereof); or combinations thereof.

For instance, the use of smaller flakes prior to intercalation and exfoliation creates a graphite article having reduced directional alignment of its graphene layers (and, thus, a lower anisotropic ratio than observed with larger flakes). Contrariwise, the application of pressure through compaction (such as through die pressing using, for instance, a reciprocal platen or flat press) or shear force (such as through calendering or roll pressing) tends to increase directional alignment (and, thus, the anisotropic ratio), although the specific manner of pressure application is relevant: the application of shear force to the article creates a greater degree of directional alignment and, therefore, higher anisotropic ratio than compaction which creates a lesser degree of directional alignment, and, therefore, a relatively lower anisotropic ratio.

For example, and more specifically, to decrease the anisotropic ratio of a graphite article, it can be formed using graphite flake sized such that at least about 70% by weight passes through an 80 mesh screen (referred to as −80 mesh) (unless otherwise indicated, all references to mesh sizes herein are to U.S. standard screens). Indeed, the graphite flake can be sized such that at least about 50% by weight passes through an 80 mesh screen but not a 140 mesh screen (referred to as 80×140 mesh) and has a moisture content of no greater than about 1.0%. In fact, the smaller the flake, the less directional alignment and, thus, the smaller anisotropic ratio. Therefore, to achieve an even smaller anisotropic ratio (i.e., greater isotropy), flake sized such that it passes through a 140 mesh screen is preferred.

Molding of a graphite article, specifically, forcing expanded graphite particles (with or without resin) into a mold by isostatic or die pressing, can also control the directional alignment of the constituent graphene layers. Molding is generally accomplished under pressures which can range from about 7 megaPascals (mPa) to about 700 mPa or higher, with the higher pressures creating greater directional alignment of the graphene layers.

Mechanical alteration of the alignment of the graphene layers through the application of pressure can also be used advantageously to control and adjust the morphology and functional characteristics of the final graphite article, and thus the directional alignment of its graphene layers. More particularly, the application of pressure can be tailored to achieve the desired characteristics, to the extent possible. Pressure can increase the in-plane thermal conductivity of the graphite article to conductivities which are equal to or even greater than that of pure copper, while the density remains a fraction of that of pure copper. Moreover, the anisotropic ratio of the resulting "aligned" articles is substantially higher than for the "pre-aligned" articles, ranging from at least about 70 to up to about 160 and higher (with respect to thermal anisotropy).

Mechanical alteration of graphene layer alignment can also be effected through embossing, especially when combined with void control. More particularly, especially when the graphite article is intended for use as a component in an electrochemical fuel cell, a resin-impregnated flexible graphite sheet can be formed so as to be relatively void-free, to optimize electrical and thermal conductivities for fuel cell applications. This can be accomplished, for instance, by calendering or compacting the sheet so as to have a relatively void-free condition (as indicated, for instance, by a density of at least about 1.5 g/cc, depending on resin content), which leads to production of an article having a relatively high thermal anisotropic ratio (potentially on the order of about 160 or higher). Where a lower anisotropic ratio is desired, such as in certain heat spreader applications, a higher void condition is preferred, which is indicated by a density in the range of about 0.4 to about 1.4 g/cc for a graphite article saturated with resin for rigidity in application and to fix the final morphology.

Figure 1A:
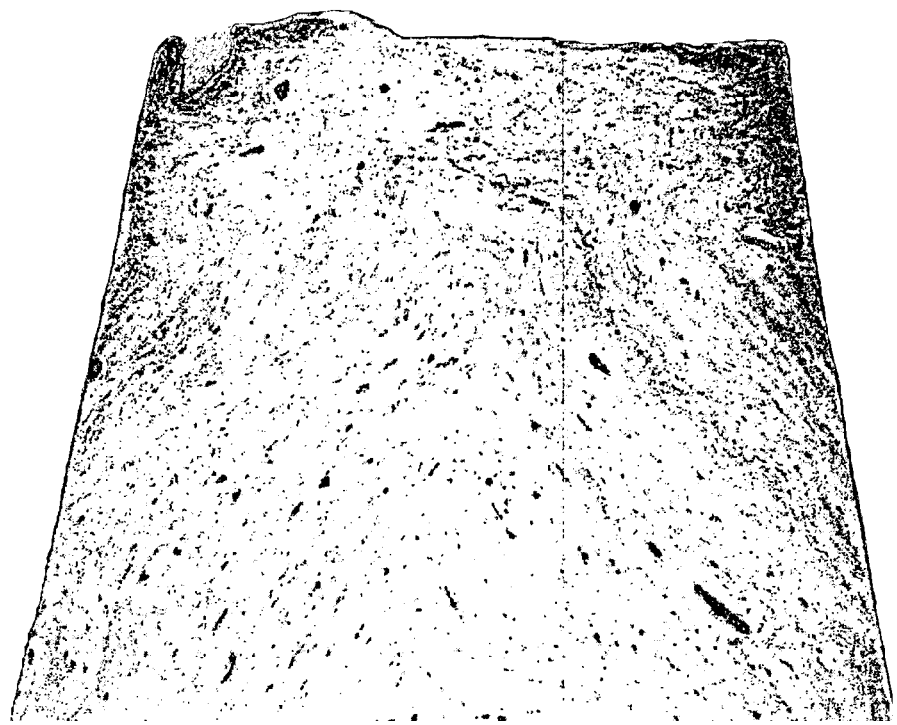

Referring now to FIGS. 1, 1(A), photomicrographs of a cross section of a wall of each of two sheets prepared using the process of the present invention are presented. The sheet of FIG. 1 was calendered to a relatively void-free condition prior to embossing. The sheet of FIG. 1(A) was not brought to a void-free condition prior to embossing. The differences in morphology (i.e., directional alignment) are apparent. It can readily be seen in FIG. 1 that the graphene layers are more aligned with (i.e., parallel to) the surfaces of the wall. Indeed, an "inverted triangle" region is evident at the upper portion of the wall and there appears a line of intersection where the graphite flow fronts meet, essentially dividing the internal structure of the wall into relatively symmetric parts. When this is contrasted with the wall of FIG. 1(A), the structure created by embossing/void control is apparent. As would be familiar to the skilled artisan, the relative amount of structure in an embossed flexible graphite wall can and will lead to differing anisotropic properties, as described above.

Figure 2:
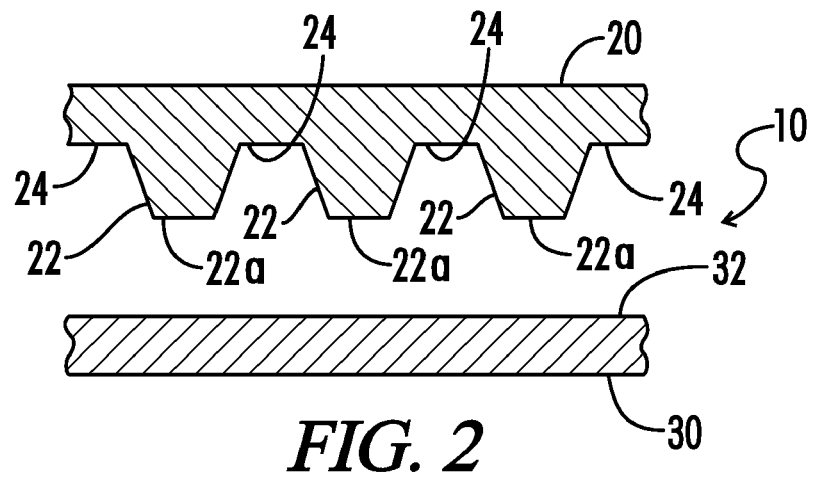
FIG. 2 is a partial cross-sectional view of an embodiment of an embossing apparatus useful to produce the flexible graphite sheets of FIGS. 1, 1(A)
Figure 2A:
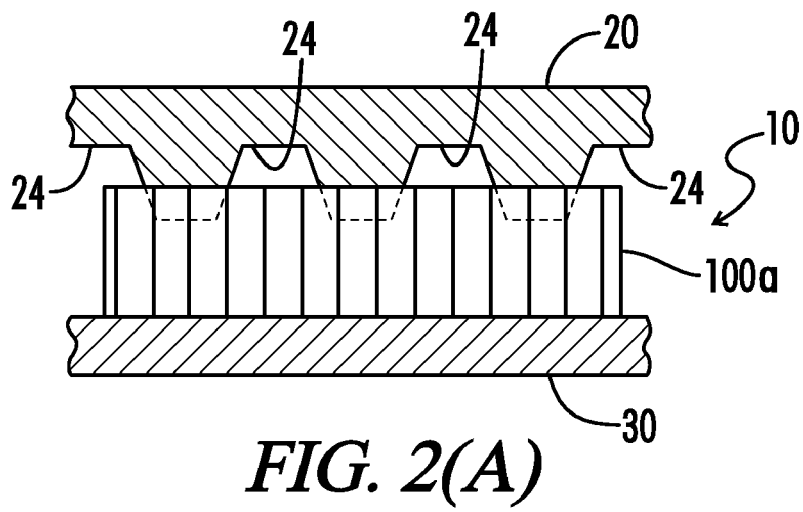
FIG. 2(A) is a partial cross-sectional view of an embodiment of the embossing apparatus of FIG. 2, seen immediately as embossing begins.
Figure 2B:
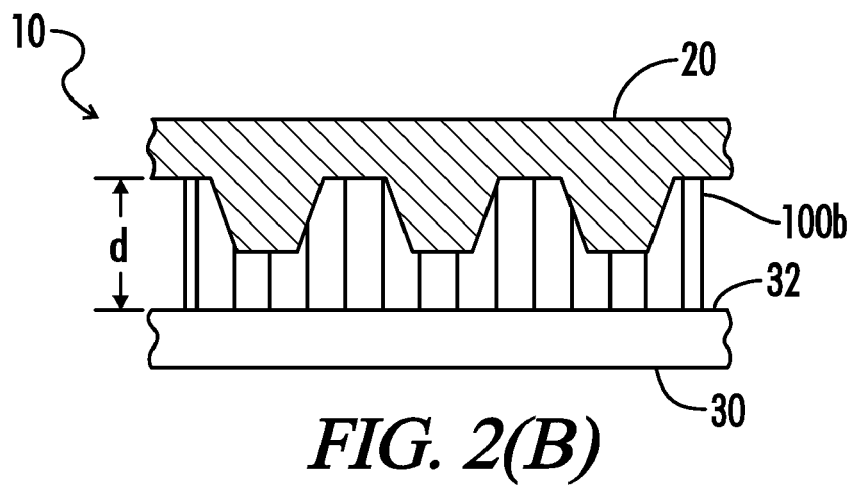
FIG. 2(B) is the embossing apparatus of FIG. 2, seen as embossing occurs.
Figure 2C:
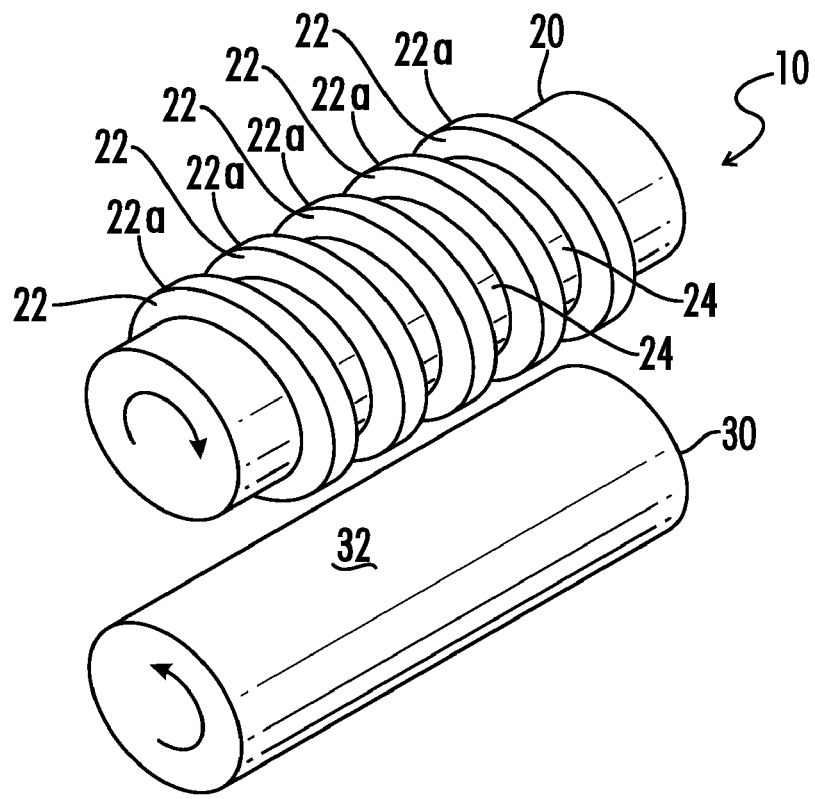
FIG. 2(C) shows a perspective view of the embossing apparatus of FIG. 2.

As illustrated in FIGS. 2-2(C), an embossing apparatus 10 for accomplishing this generally comprises two opposed elements 20 and 30, at least one of which is an embossing element 20, and has an embossing pattern thereon. The embossing pattern is formed by arraying a series of walls 22, having tops, or lands, 22a having a predetermined height from the surface of embossing element 20, separated by channel floors 24, about the surface of embossing element 20. Typically, channel floors 24 are in fact the surface of embossing element 20. Landing element 30 preferably comprises a generally flat-surfaced element against which embossing element 20 operates to force the embossing pattern onto the resin-impregnated flexible graphite sheet. The impact surface 32 of landing element 30 can also have textures or other artifacts to facilitate the embossing process or apply a desired texture or pattern to the non-embossed surface of the flexible graphite sheet.

Embossing element 20 and landing element 30 can comprise rollers, plates, a combination thereof, or other structures, provided they are capable of cooperating to emboss a pattern on a flexible graphite sheet, and preferably comprise rollers, as shown in FIG. 2(C). Embossing element 20 and landing element 30 are arrayed in embossing apparatus 10 such that surface 32 of landing element 30 is separated from channel floors 24 of embossing element 20 by a distance "d" which is at least equal to the height of walls 22. Indeed, in the most preferred embodiment, surface 32 of landing element 30 is separated from channel floors 24 of embossing element 20 by distance "d" which is equal to the height of walls 22 plus the desired thickness of the embossed flexible graphite sheet 100b at the location of sheet floors of flexible graphite sheet 100b, (i.e., between the walls of sheet 100b).

The calendered and resin-impregnated flexible graphite sheet 100a is formed so as to have a thickness in the region of the embossing pattern prior to embossing which is less than distance "d", but greater than the distance between surface 32 of landing element 30 and walls 22 of embossing element 20, as illustrated in FIG. 2. During embossing, material (i.e., graphite and resin) in sheet 100a flow from the area of sheet 100a which encounters pressure from lands 22a of walls 22 of embossing element 20 pressing against sheet 100a to the gap 24a between sheet 100a and channel floors 24 of embossing element 20, as illustrated in FIGS. 2-2(B). This "rearrangement" of the graphite/resin of calendered and resin-impregnated flexible graphite sheet 100a is surprising, and leads to an embossed flexible graphite sheet 100b, having sheet floors and sheet lands which form a channel pattern corresponding to the embossing pattern of embossing element 20 (as shown in FIGS. 2 and 2(A)).

Yet another manner of providing engineered directional alignment of the graphene layers of a graphite article is through mechanical alteration of the graphene layers in specified regions of the article. The regions are mechanically altered by localized impaction of a surface of a graphite article, such as a flexible graphite sheet, to transversely deform the surface and displace graphite within the sheet at a plurality of locations and subsequently pressing the deformed, impacted surface to a planar surface.

Figure 3:
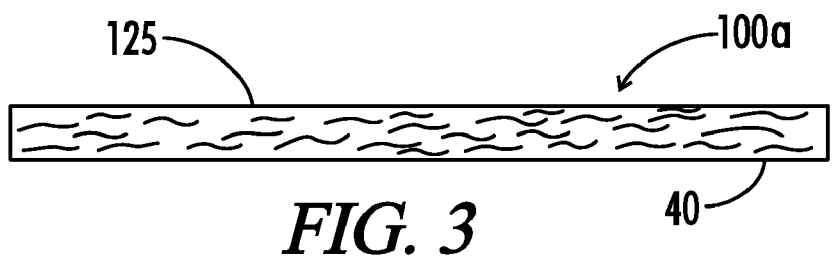
FIG. 3 is an enlarged sketch of a cross-section of a flexible graphite sheet.
Figure 4A:
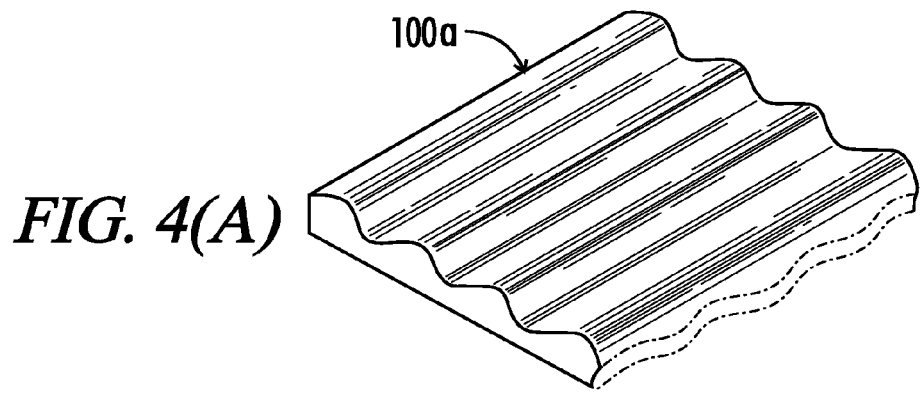
FIGS. 4(A)-4(C) are sketches of a flexible graphite sheet showing different patterns of localized impaction.
Figure 4B:
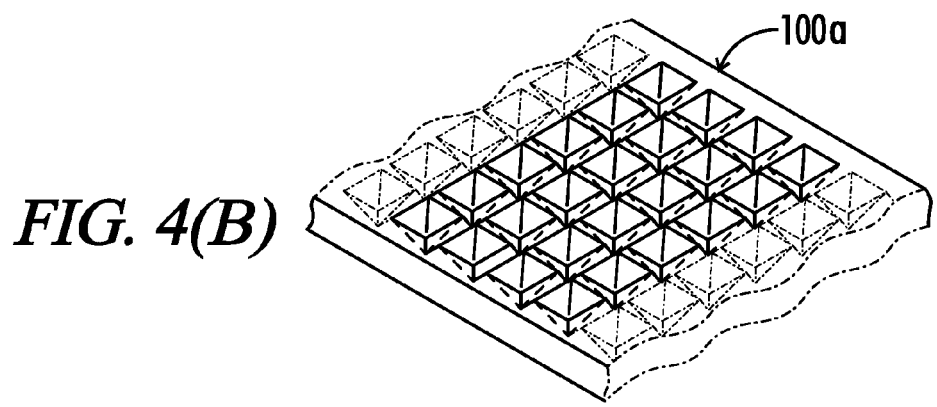
Figure 4C:
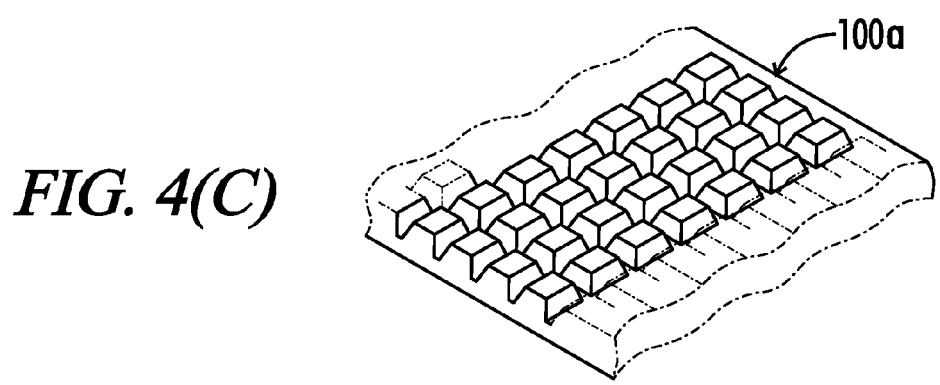
Figure 5:
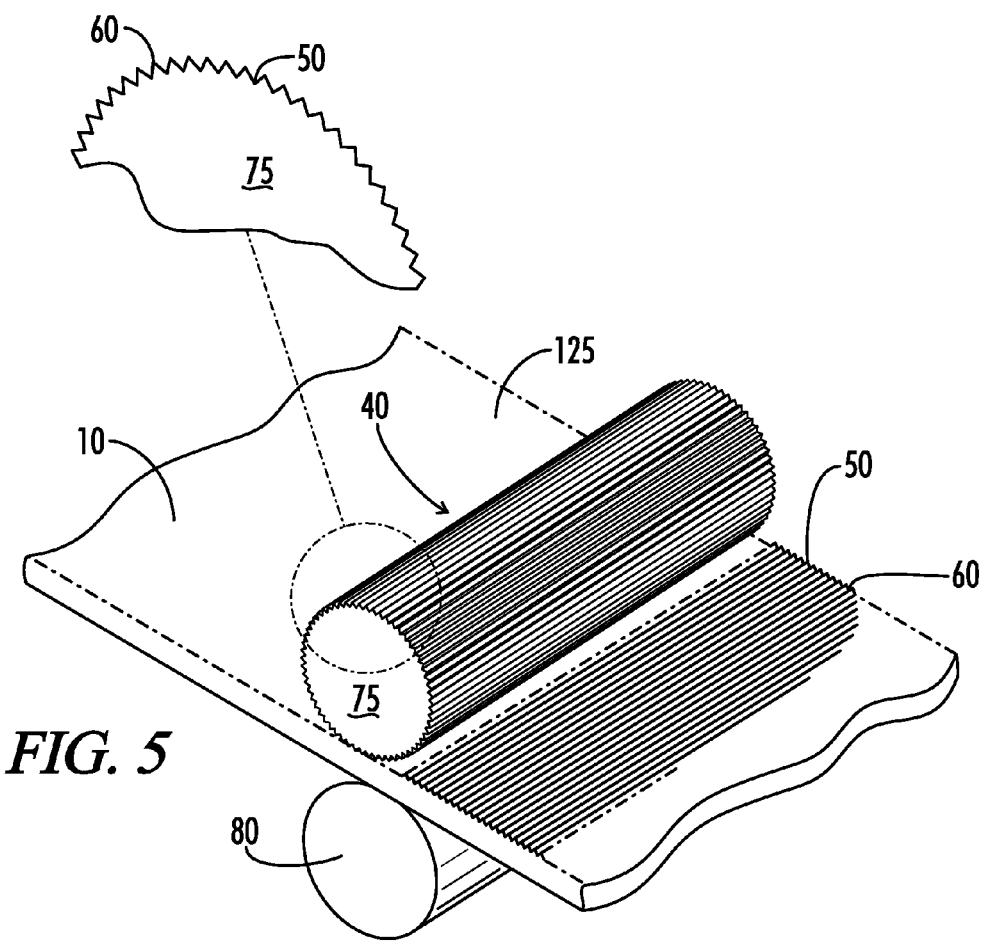
FIG. 5 shows a perspective view of an apparatus for effecting the localized surface impaction of the sheet of FIG. 3.
Figure 6:
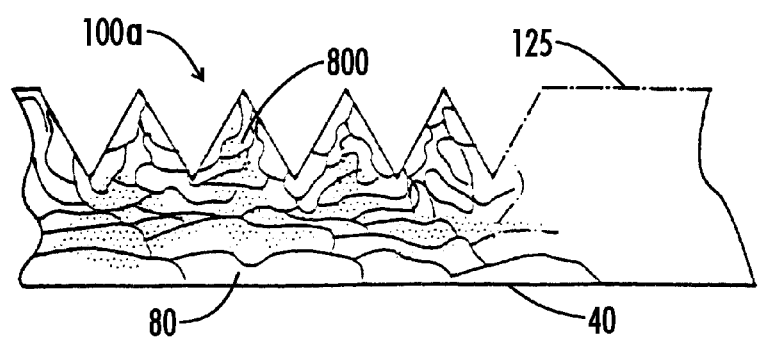
FIG. 6 is an enlarged sketch of the sheet of FIG. 5 after compression.
Figure 6A:
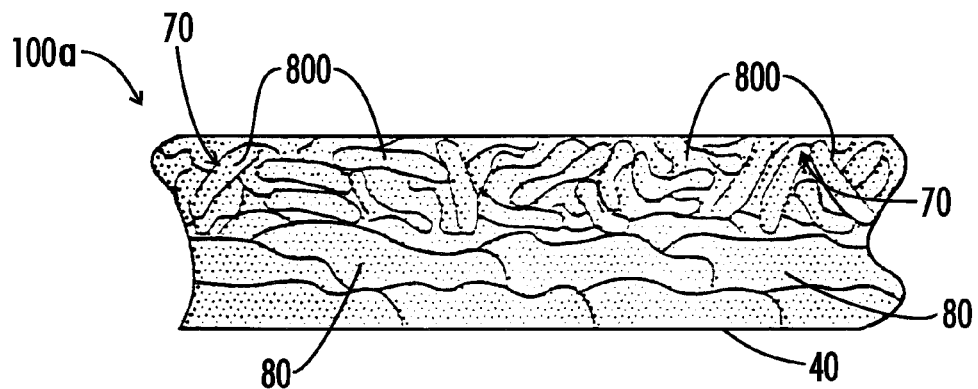
FIG. 6(A) is a side elevation view of the sheet of FIG. 6 subsequent to compression of the deformed surfaces to planar form.
Figure 7:
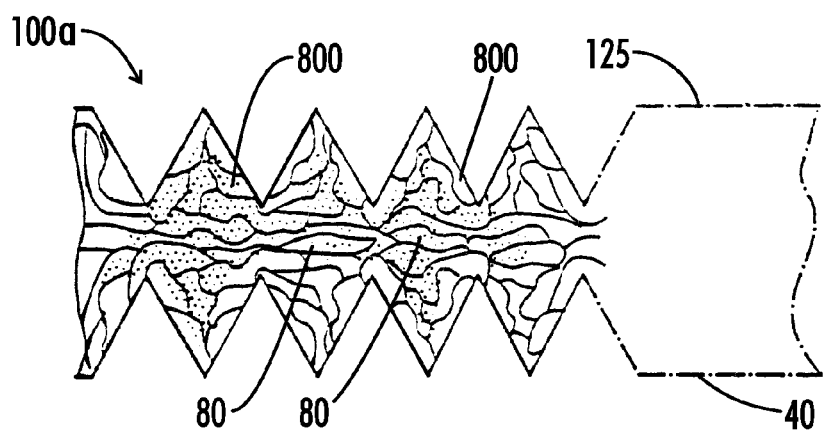
FIG. 7 is an enlarged side elevation view of the sheet of FIG. 3 which is transversely deformed at both opposed surfaces.
Figure 7A:
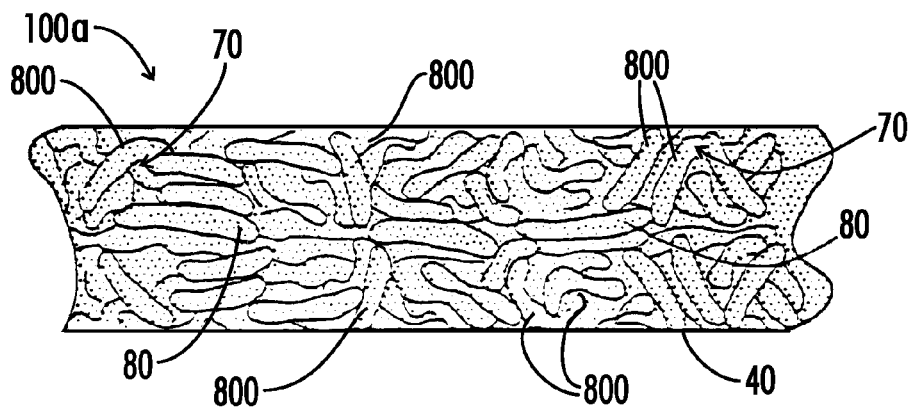
FIG. 7(A) is a side elevation view of the sheet of FIG. 7 subsequent to compression of the deformed surfaces to planar form.

For example, a planar surface 125 of flexible graphite sheet 100a of FIG. 3 can be transversely deformed, advantageously in a continuous pattern, by mechanically impacting the planar surface 125 with penetration to a predetermined depth, e.g., ⅛ to ½ of the thickness of sheet 100a, to displace graphite within the sheet 100a, such as by means of a device 40 such as shown in FIG. 5 which includes a roller 75, having grooves 50 and ridges 60, co-acting with smooth surfaced roller 80 (alternate deformation patterns are illustrated in FIGS. 4(A)-4(C). The resulting article is illustrated in the side elevation view of FIG. 6. The misalignment of the graphite particles (and, therefore, the graphene layers) is due to displacement of graphite entirely within flexible graphite sheet 100a resulting from mechanical impact. The transversely deformed article of FIG. 6 is compressed, e.g, by roll-pressing, to restore the surface 125 to a planar condition as illustrated in FIG. 6(A). With reference to FIG. 6(A), after restoring surface 30 to a planar condition, sheet 100a has a region 70, adjacent planar surface 30, in which expanded graphite particles 800 are substantially unaligned with parallel, planar opposed surfaces 125, 40, resulting in a reduced anisotropic ratio (i.e., greater isotropy). With reference to FIG. 7, a flexible graphite sheet 10 can be transversely deformed at both opposed surfaces 125, 40 either sequentially or simultaneously, and subsequently compressed to provide planar, parallel opposed surfaces 125, 40 as shown in FIG. 7(A). The article of FIG. 7(A) has region 70 of substantially unaligned expanded graphite particles respectively adjacent both of the parallel, planar surfaces 125, 40, resulting in yet further reduced anisotropy.

Practice of the invention as described above permits control of the anisotropic characteristics of a graphite article. In this way, the article can be engineered so as to have optimized characteristics for each specific end use, whether it be heat management for electronic components or improved thermal and electrical management for fuel cell components or as a heat spreader in a flooring system.

Laminated Articles

In the practice of the present invention, a plurality of the thusly-prepared flexible graphite sheets may optionally be laminated into a unitary article, such as a block or other desirable shape. The anisotropic flexible sheets of compressed particles of exfoliated graphite can be laminated with a suitable adhesive, such as pressure sensitive or thermally activated adhesive, therebetween. The adhesive chosen should balance bonding strength with minimizing thickness, and be capable of maintaining adequate bonding at the service temperature of the electronic component for which heat dissipation is sought. Suitable adhesives would be known to the skilled artisan, and include phenolic resins.

Most preferably, the "a" direction extending parallel to the planar direction of the crystal structure of the graphite of the anisotropic flexible sheets of compressed particles of exfoliated graphite which form this embodiment of the laminated article are oriented to direct heat from the electronic component for which heat dissipation is desired, in the desired direction. In this way, the anisotropic nature of the graphite sheet directs the heat from the external surface of the electronic component (i.e., in the "a" direction along the graphite sheet), and is not degraded by the presence of the adhesive. Such a laminate generally has a density of about 1.1 to about 1.35 g/cc, and a thermal conductivity in the in-plane (i.e., "a") direction of about 220 to about 250 and through-plane (i.e., "c") direction of about 4 to about 5. The typical laminate therefore has a thermal anisotropic ratio, or ratio of in-plane thermal conductivity to through-plane thermal conductivity, of about 44 to about 63).

The values of thermal conductivity in the in-plane and through-plane directions of the laminate can be manipulated by altering the directional alignment of the graphene layers of the flexible graphite sheets used to form the laminate, or by altering the directional alignment of the graphene layers of the laminate itself after it has been formed. In this way, the in-plane thermal conductivity of the laminate is increased, while the through-plane thermal conductivity of the laminate is decreased, this resulting in an increase of the thermal anisotropic ratio of the laminate to at least about 70, and preferably at least about 110. Most preferably, the thermal anisotropic ratio of the laminate is increased to at least about 160.

One of the ways this directional alignment of the graphene layers can be achieved is by the application of pressure to the component flexible graphite sheets, either by calendaring the sheets (i.e., through the application of shear force) or by die pressing or reciprocal platen pressing (i.e., through the application of compaction), with calendaring more effective at producing directional alignment. For instance, by calendaring the sheets to a density of 1.7 g/cc, as opposed to 1.1 g/cc, the in-plane thermal conductivity is increased from about 240 W/m° C. to about 450 W/m° C. or higher, and the through-plane thermal conductivity is decreased from about 23 W/m° C. to about 2 W/m° C., thus greatly increasing the thermal anisotropic ratio of the individual sheets (from about 10 to about 225) and, by extension, the laminate formed therefrom.

Alternatively, once the laminate is formed, the directional alignment of the graphene layers which make up the laminate in gross is increased, such as by the application of pressure, resulting in a density greater than the starting density of the component flexible graphite sheets that make up the laminate. Indeed, a final density for the laminated article of at least about 1.4 g/cc, more preferably at least about 1.6 g/cc, and up to about 2.0 g/cc can be obtained in this manner. The pressure can be applied by conventional means, such as by die pressing or calendaring. Pressures of at least about 60 megapascals (MPa) are preferred, with pressures of at least about 550 MPa, and more preferably at least about 700 MPa, needed to achieve densities as high as 2.0 g/cc.

Surprisingly, increasing the directional alignment of the graphene layers can increase the in-plane thermal conductivity of the graphite laminate to conductivities which are equal to or even greater than that of pure copper, while the density remains a fraction of that of pure copper. Moreover, the thermal anisotropic ratio of the resulting "aligned" laminates are substantially higher than the "pre-aligned" laminates, ranging from at least about 70 to up to about 160 and higher. Additionally, the resulting aligned laminate also exhibits increased strength, as compared to a non-"aligned" laminate.

Depending on the intended end-use of the aligned article, the alignment process can create differing degrees of alignment within the laminate, providing further control, and permitting the manipulation, of the anisotropy of the article.

The resulting aligned laminate can then be pressed or formed into a desired shape (indeed, the alignment process can form the laminate into a desired shape), or machined. The shaped, aligned laminate can be used as a thermal solution, such as a thermal interface, a heat spreader and/or a heat sink, and directionally dissipate heat from a heat source, such as an electrical component, potentially at least as well as copper without copper's weight disadvantages.

Radiant Heated Flooring Systems

Figure 8:
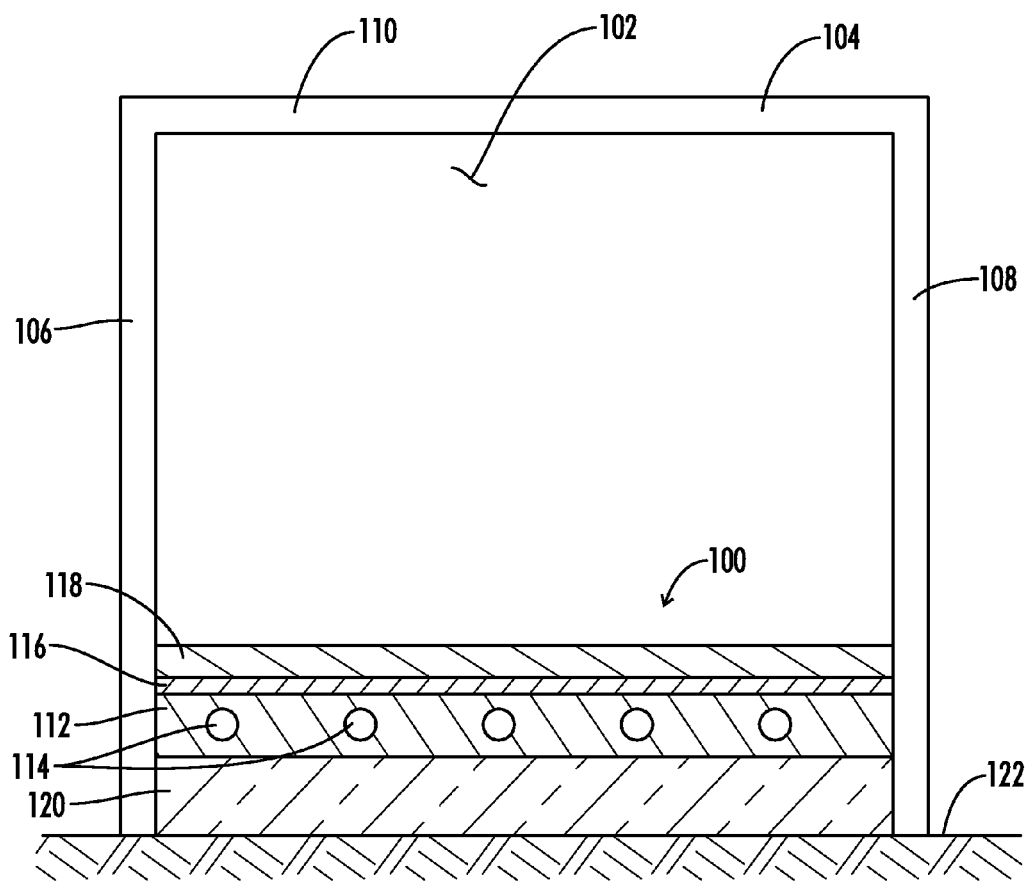
FIG. 8 is a schematic side elevation cut-away view of a heated flooring system utilizing the flexible graphite heat spreader of the present invention.

FIG. 8 schematically illustrates a flooring system 100 which is part of a space or room 102 of a building 104. The interior space 102 of building 104 is defined by a plurality of planar boundary structures such as the flooring system 100, walls 106 and 108, and a ceiling 110. Although the present invention is described primarily in the context of the flooring system 100, it will be understood that the principles hereof may be applied to heating or cooling systems embedded in any of the boundary structures such as walls 106 or 108 or ceiling 110.

The flooring system 100 includes a flooring substrate 112. A heating or cooling element 114 is in heat transfer relationship with the flooring substrate 112. Although the following description primarily refers to a heating element 114, it will be understood that this includes cooling elements. The element 114 could more generally be referred to as a heat transfer element which can either heat or cool.

Heating element 114 may be any available type of heating or cooling element, including but not limited to electrical resistance wiring heating elements and tubing networks for carrying heat transfer fluids. The flooring substrate 112 can be any conventional flooring substrate of a type suitable for use with the selected heating element. Suitable heating elements 114 and flooring substrates 112 are described in further detail below.

A heat spreader 116 which comprises a layer of flexible graphite material, is in heat transfer relationship with the flooring substrate 112, and preferably, overlies and engages the flooring substrate 112. It will be appreciated, however, that heat spreader 116 could optionally be embedded in or even underlie certain types of flooring substrates and still achieve the advantages of the present invention.

A floor covering 118 overlies the heat spreader 116. It will be appreciated that floor covering 118 need not directly enage heat spreader 116, and may be separated therefrom by various layers, such as padding for a carpet for example. In fact, as noted above, the heat spreader 116 can even be embedded in or located below the flooring substrate 112. Thus when one layer is described as overlying another, that does not require that they engage each other, unless further specific language so states. As further described below, the floor covering 118 may be any conventional floor covering including but not limited to vinyl flooring, carpet, hardwood flooring, and ceramic tile.

Optionally, a layer of insulating material 120 underlies the flooring substrate 112 and/or the heating element 114 and insulates the same from a ground surface 122, or a space underneath the floor.

Figure 9:
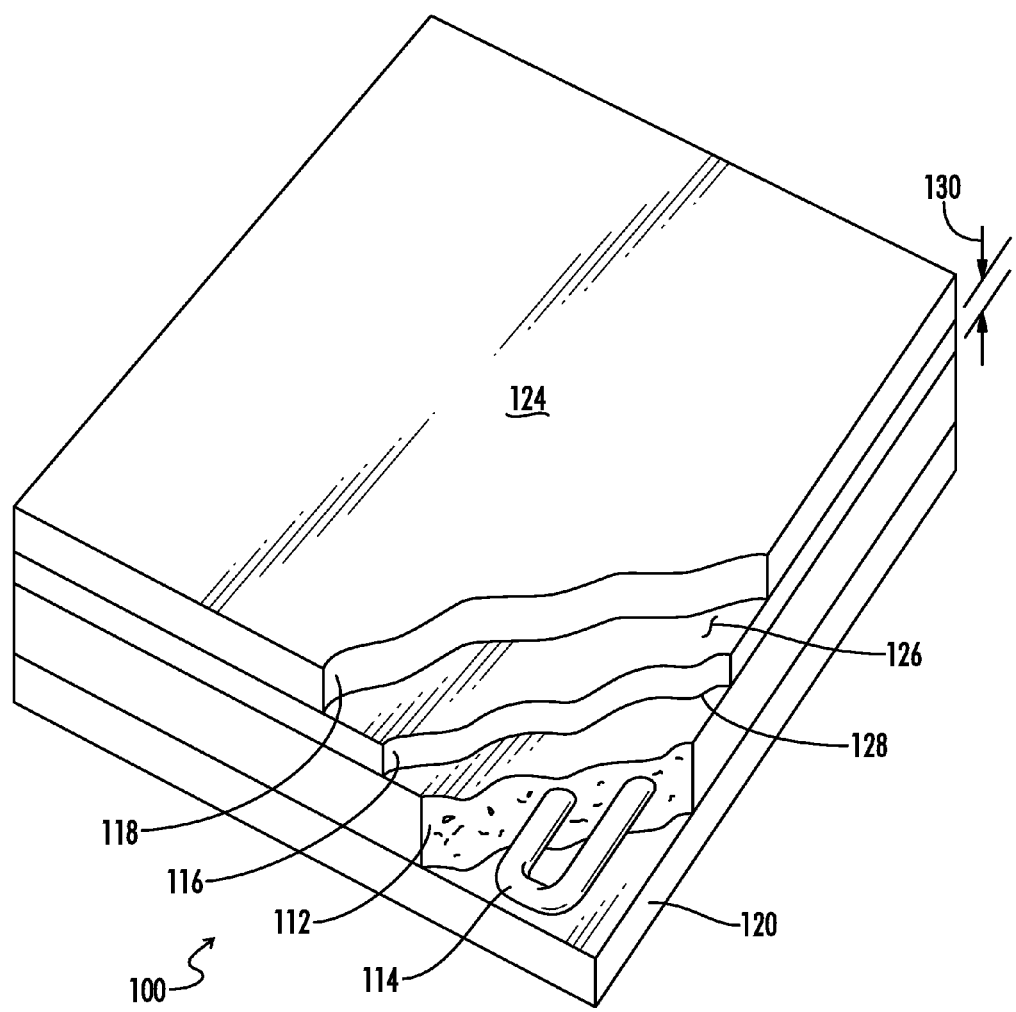
FIG. 9 is a perspective view of the flooring system of FIG. 8 having adjacent layers cut away to illustrate the details of each.

As best illustrated in the perspective view of FIG. 9, the floor covering 118 has an exposed surface 124 which is exposed to the interior of room 102 and upon which human occupants of the room 102 would walk.

The heat spreader 116 comprised of the layer of flexible graphite material has two opposed major surfaces 126 and 128 which may also be referred to top and bottom surfaces 126 and 128, respectively. Heat spreader 116 has a thickness 130 defined between the surfaces 126 and 128. The layer of flexible graphite material has a first thermal conductivity or heat conductivity parallel to the planar surfaces 126 and 128 and a second thermal conductivity normal to the planar surfaces 126 and 128. As described in detail above, the thermal conductivity of the flexible graphite sheet parallel to surfaces 126 and 128 is greater than the thermal conductivity normal to those surfaces. The ratio of these thermal conductivities can be described as an anisotropic ratio, which preferably has a value of at least 2.0. More preferably the anisotropic ratio is in the range of from about 2 to about 250. Still more preferably the anisotropic ratio is at least about 30.

Typically, the heat conductivity normal to the planar surfaces 126 and 128 is at least about 2 W/m° C., and the heat conductivity parallel to the surfaces 126 and 128 is at least about 140 W/m° C.

It is noted that for a heat conductivity normal to the planar surfaces 126 and 128 of at least about 7 W/m° C., and an anisotropic ratio of 2, the heat conductivity parallel to the surfaces would be at least about 14 W/m° C.

Also as described above the material from which the heat spreader 116 is constructed is a relatively lightweight material which has a density of at least about 0.08 g/cc. More preferably the material has a density of at least about 0.6 g/cc.

Optionally, the flexible graphite material of layer 116 may be impregnated with resin as described above.

Also, the flexible graphite layer 116 may be a laminate comprising a plurality of flexible graphite sheets each of which comprises a directionally aligned graphene layer.

Heating Elements and Flooring Substrates

The flooring substrate 112 and heating elements 114 may be any conventional radiant floor heating system.

For example, the heating elements 114 may be electrical resistance wiring heating elements such as those utilized in ThernoTile™ radiant floor heating systems available from ThermoSoft International Corporation of Buffalo Grove, Ill.

Such electrical resistance wiring type heating elements 114 are typically utilized with flooring substrates 112 of a type in which the heating element 114 can be completely embedded.

For example, if the floor covering 118 is to be vinyl flooring or carpet, the electrical resistance type heating elements 114 will typically be embedded in a flooring substrate 112 comprising a layer of cement.

Electrical resistance wiring type heating elements 114 may also be attached to a metal flooring layer, such as aluminum which aids in spreading the heat through the floor.

Alternatively, if the floor covering 118 is to be ceramic type, the electrical resistance type heating element 114 will typically be embedded in a flooring substrate 112 comprising a layer of thin-set mortar.

If a heating element 114 of the type comprising a tubing network for carrying a heat transfer fluid such as hot water is selected, it may for example be of the type available from Uponor Wirsbo Company of Apple Valley, Minn. Such systems typically use cross-linked polyethylene (PEX) tubing, which may for example be embedded in a concrete flooring substrate 112. Such systems may also use other tubing materials such as copper.

Figure 10:
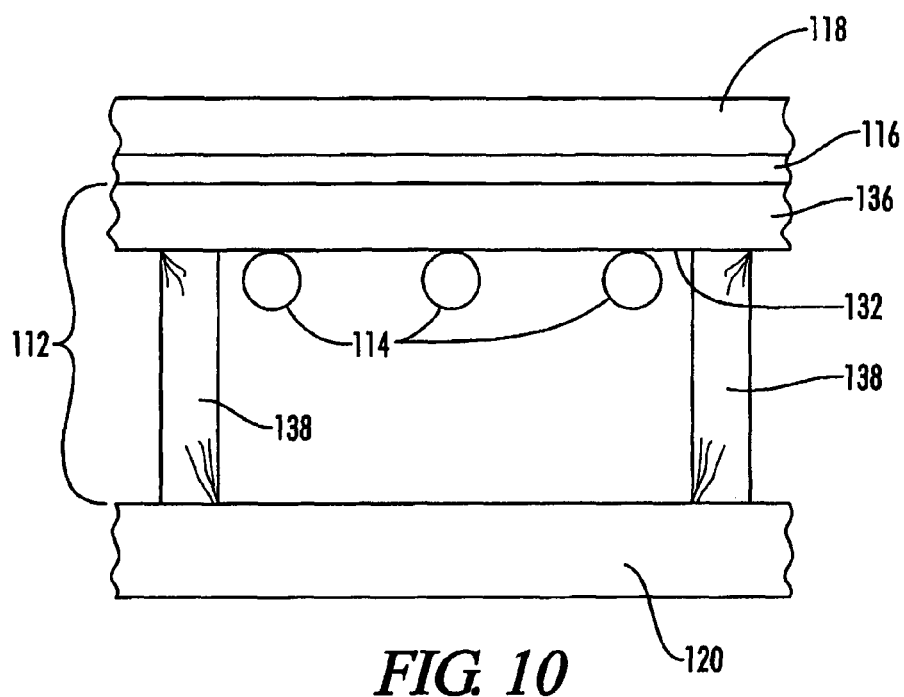
FIG. 10 is a schematic elevation sectioned view of an alternative type of flooring substrate having a wooden sub floor to which a tubing network is attached.

Tubing type heating elements 114 may also be utilized with conventional wooden flooring substrates as shown in FIG. 10. In such cases, the tubing is attached to the underside 132 of a conventional plywood or oriented strand board wooden sub floor 136 which spans conventional wooden floor stringers 138. In this embodiment the wooden sub floor 136 and stringers 138 comprise the flooring substrate 112 of FIGS. 8 and 9. Optionally the heat spreader 116 could be below the sub floor 136, but above heating elements 114 as shown in FIG. 11.

The optional insulating layer 120 may be any suitable insulation. One system for insulation 120 which is particularly designed for use with radiant heating systems is the EPS "Expanded Polystyrene" insulation system available from Benchmark Foam, Inc., of Watertown, S.D. Such an insulating layer prevents loss of heat from the heating element 114 to the ground surface 122 or to a room space below the floor if the floor is not at ground level.

Figure 11:
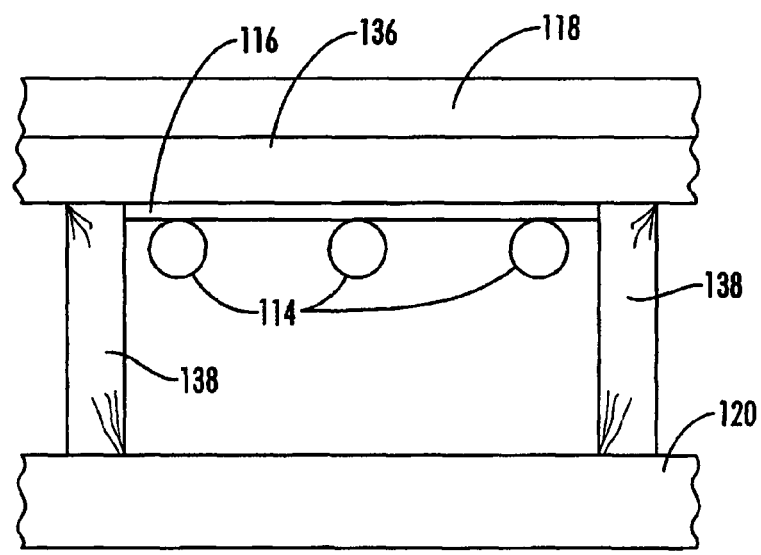
FIG. 11 shows another version of a flooring substrate having a wooden floor.

Also, the electrical resistance type heating elements 114 maybe utilized with wooden floors in place of the tubing type heating elements, analogous to the layouts shown in FIGS. 10 and 11.

Alternatively, the flooring substrate 112 associated with the heating element 114 may be constructed using graphite materials. Such a graphite substrate 112 may be formed by any of the processes described above such as molding or other compression techniques to provide any desired anisotropic properties. Additionally, the graphite flooring substrate 112 may be made up by lamination of thinner layers of flexible graphite material as described above. Furthermore, when utilizing a flooring substrate 112 constructed utilizing graphite materials, the heat spreader 116 may be constructed integrally with the flooring substrate 112.

Methods of Constructing the Flexible Graphite Flooring Heat Spreader

The flooring system 100 or any other boundary structure such as wall 106 or ceiling 110 of building 104 utilizing the present invention is preferably formed by placing the heat spreader 116 over the flooring substrate 112.

In one preferred embodiment this is accomplished by providing the heat spreader 116 in rolls of flexible sheet-like material and unrolling the sheet 116 from the roll to cover the flooring substrate 112. The heat spreader layer 116 may be placed in direct engagement with any of the flooring substrates 112 previously described. The heat spreader layer 116 may also be in indirect heat transfer engagement with the flooring substrate 112, if a thermal interface, adhesive layer, or other material is placed therebetween for the purpose of improving the physical bond and the thermal transfer between the substrate 112 and heat spreader 116. Also, as noted above, the heat spreader could be below the heating element.

Optionally, the flexible graphite material making up heat spreader 116 can be provided in relatively rigid sheets in the form of tiles or the like which can be described as generally planar elements. In this case adjacent edges of the tiles or planar elements are place closely adjacent the like edges of adjacent such elements, and preferably the adjacent edges abut though they need not do so in every case.

When the heating element 114 is operated to provide heat to the flooring system 100, the heat energy from the heating element 114 moves generally in an upward direction and is transferred to the heat spreader 116, which due to its preferential heat transfer conductivity in the lateral direction spreads the heat energy laterally generally parallel to the major surfaces 126 and 128, thus providing a more uniformly distributed heat to the floor covering 118 and to the room space 102 than would be provided in the absence of the heat spreader 116.

It will be appreciated that regardless of what type of heating element 114 is utilized, such heating elements 114 are generally constructed in the form of a plurality of serpentine runs of either electrical heating element or fluid tubing throughout the flooring substrate 112. With prior art systems, it has been necessary to place those serpentine runs of the heating elements 114 relatively close together due to the fact that the flooring substrate 112 and floor covering 118 traditionally used do not provide much lateral transfer of heat. It will be appreciated that by the use of the heat spreader 116 of the present invention, the heating elements 114 may be spread more widely apart, while still achieving a much-improved uniformity of heat distribution across the flooring system 100, thus reducing the cost of manufacture and installation of the heating element 114.

All of the above description is also applicable to use of the described system to cool rather than heat a room space. For the cooling context, the heating element 114 is replaced with a cooling element. The heat spreader 116 functions to move heat energy out of the room and to the cooling elements.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method of heating a space of a building comprising:
   (a) providing a planar boundary structure defining an interior surface of said space, said structure including a structure substrate,
   (b) providing a heating element in heat transfer relationship with said structure substrate, and
   (c) providing a heat spreader in roll form, wherein the heat spreader comprises a layer of compressed particles of exfoliated graphite having an in-plane thermal conductivity of at least 450 W/m° C., wherein said heat spreader has a thermal anisotropy ratio of at least 225, said ratio being defined as a ratio of a thermal conductivity parallel to said interior surface to a thermal conductivity normal to said interior surface;
   (d) unrolling the heat spreader and positioning it in heat transfer relationship with said heating element and said structure substrate;
   (e) providing heat energy to heat spreader and said structure substrate from said heating element.

2. The method of claim 1, which further comprises unrolling a roll of compressed particles of exfoliated graphite to cover said structure substrate and thereby provide said heat spreader.

3. The method of claim 1, wherein said heat spreader overlies said structure.

4. The method of claim 1, wherein: said layer of compressed particles of exfoliated graphite has a density of at least 1.7 g/cc.

5. The method of claim 1, wherein: said heating element comprises an electrical resistance wiring heating element.

6. The method of claim 1, wherein: said structure substrate comprises a layer of cement in which said heating element is embedded.

7. The method of claim 1, wherein: said structure substrate comprises a layer of thin set mortar in which said heating element is embedded.

8. The method of claim 1, wherein: said heating element comprises a tubing network for carrying a heat transfer fluid.

9. The method of claim 8, wherein: said structure substrate comprises a wooden sub floor to which the tubing network is attached.

* * * * *